(12) United States Patent
Nakakura

(10) Patent No.: US 9,688,348 B2
(45) Date of Patent: Jun. 27, 2017

(54) HYDRAULIC HOSE FITTING AND HYDRAULIC DEVICE

(71) Applicant: Shimano Inc., Sakai, Osaka (JP)

(72) Inventor: Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 53 days.

(21) Appl. No.: 14/569,888

(22) Filed: Dec. 15, 2014

(65) Prior Publication Data

US 2016/0169428 A1 Jun. 16, 2016

(51) Int. Cl.
*B62L 3/02* (2006.01)
*B62J 23/00* (2006.01)

(52) U.S. Cl.
CPC ............. *B62L 3/023* (2013.01); *B62J 23/00* (2013.01)

(58) Field of Classification Search
CPC .... B62L 1/00; B62L 3/02; B62L 3/023; B62L 3/026; F16L 23/036; B62J 23/00
USPC .................................. 188/26, 24.22
See application file for complete search history.

(56) References Cited

U.S. PATENT DOCUMENTS

| | | | |
|---|---|---|---|
| 4,023,836 A * | 5/1977 | Applehans | F16L 23/02 285/148.13 |
| 5,027,303 A | 6/1991 | Witte | |
| 7,806,006 B2 | 10/2010 | Phillips et al. | |
| 7,861,599 B2 | 1/2011 | Meggiolan | |
| 7,997,389 B2 * | 8/2011 | Chen | B62K 23/06 188/24.22 |
| 8,006,574 B2 | 8/2011 | Meyer | |
| 8,065,926 B2 | 11/2011 | Meyer | |
| 8,534,428 B2 * | 9/2013 | Yamashita | B60T 7/102 188/24.22 |
| 2002/0180209 A1* | 12/2002 | Kariyama | B60T 1/065 285/256 |
| 2005/0178210 A1 | 8/2005 | Lanham | |
| 2008/0053758 A1* | 3/2008 | Ruckh | B60T 11/16 188/26 |
| 2009/0120210 A1 | 5/2009 | Phillips et al. | |
| 2010/0263468 A1 | 10/2010 | Fisher et al. | |
| 2013/0154257 A1* | 6/2013 | Ault | F16L 33/2073 285/251 |
| 2013/0180806 A1* | 7/2013 | Iwai | F16D 65/125 188/26 |

(Continued)

FOREIGN PATENT DOCUMENTS

CN 203463834 U * 3/2014
DE 2 205 402 A1 7/1976

(Continued)

*Primary Examiner* — Melanie Torres Williams
(74) *Attorney, Agent, or Firm* — Global IP Counselors, LLP

(57) ABSTRACT

A hydraulic hose fitting is basically provided with a first connection portion and a second connection portion. The first connection portion is configured to be attached a hydraulic device. The first connection portion has a first fluid passageway with a first center longitudinal axis and a fastener structure including one of a fastener receiving hole and an attachment stud that has a second center longitudinal axis that is non-perpendicular and non-coaxial with the first center longitudinal axis. The second connection portion is configured to be attached to a hydraulic hose. The second connection portion has a second fluid passageway fluidly communicating with the first fluid passageway.

17 Claims, 11 Drawing Sheets

(56) References Cited

U.S. PATENT DOCUMENTS

| | | |
|---|---|---|
| 2013/0233091 A1 | 9/2013 | Tetsuka |
| 2013/0233092 A1 | 9/2013 | Tetsuka |
| 2014/0060212 A1 | 3/2014 | Tetsuka et al. |
| 2014/0197285 A1 | 7/2014 | Lucas et al. |

FOREIGN PATENT DOCUMENTS

| | | | | |
|---|---|---|---|---|
| DE | 25 30 745 A1 | 1/1977 | | |
| JP | 3047816 U | 2/1998 | | |
| JP | WO 2013042573 A1 * | 3/2013 | ............ | F16L 23/036 |
| WO | 2011/030215 A1 | 3/2011 | | |
| WO | 2012/056522 A1 | 5/2012 | | |
| WO | 2012/056558 A1 | 5/2012 | | |
| WO | 2013/017465 A2 | 2/2013 | | |

\* cited by examiner

HYDRAULIC HOSE FITTING AND HYDRAULIC DEVICE

BACKGROUND

Field of the Invention

This invention generally relates to a hydraulic hose fitting. More specifically, the present invention relates to a hydraulic hose fitting that is used with a hydraulic device (e.g., a hydraulic brake operating device, a hydraulic brake caliper, etc.).

Background Information

In recent years, some bicycles have been provided with hydraulic braking systems. The hydraulic braking system for a bicycle typically has a hydraulic brake operating device that is fluidly coupled to a hydraulic brake caliper by a hydraulic hose. The hydraulic brake caliper is hydraulically actuated by hydraulic fluid flowing through the hydraulic brake hose in response to operation of the hydraulic brake operating device. In particular, operation of the hydraulic brake operating device forces hydraulic fluid through the hydraulic hose to the brake caliper. The hydraulic fluid then moves one of more pistons to cause brake pads of the hydraulic brake caliper to squeeze a rotor that is attached to a hub of a bicycle wheel. Often, a hydraulic hose fitting is used at each end of the hydraulic hose to connect the hydraulic hose to the hydraulic brake operating device and the hydraulic brake caliper.

SUMMARY

Generally, the present disclosure is directed to various features of a hydraulic hose fitting that is used to connect a hydraulic hose to one of a hydraulic brake operating device and a hydraulic brake caliper. In one feature, a bicycle hose fitting is configured to provide a desired routing arrangement.

In view of the state of the known technology and in accordance with a first aspect of the present disclosure, a hydraulic hose fitting is provided that basically comprises a first connection portion and a second connection portion. The first connection portion is configured to be attached to a hydraulic device. The first connection portion has a first fluid passageway with a first center longitudinal axis and a fastener structure having a second center longitudinal axis that is non-perpendicular and non-coaxial with the first center longitudinal axis. The second connection portion is configured to be attached to a hydraulic hose. The second connection portion has a second fluid passageway fluidly communicating with the first fluid passageway.

In accordance with a second aspect of the present invention, the hydraulic hose fitting according to the first aspect is configured so that the second center longitudinal axis is parallel the first center longitudinal axis.

In accordance with a third aspect of the present invention, the hydraulic hose fitting according to the first aspect is configured so that the first connection portion includes a base part and a projecting part. The base part includes fastener structure and a first section of the first fluid passageway. The projecting part includes a second section of the first fluid passageway.

In accordance with a fourth aspect of the present invention, the hydraulic hose fitting according to the third aspect is configured so that the fastener structure includes a fastener receiving hole.

In accordance with a fifth aspect of the present invention, the hydraulic hose fitting according to the fourth aspect is configured so that the base part has an attachment surface that is configured to be attached to the hydraulic device. The fastener receiving hole has an opening in the attachment surface. The projecting part projects from the attachment surface.

In accordance with a sixth aspect of the present invention, the hydraulic hose fitting according to the third aspect is configured so that the second center longitudinal axis is parallel to the first center longitudinal axis. The base part has a first length measured in a first direction which perpendicularly intersects the first and second center longitudinal axes. The base part has a second length measured in a second direction which is perpendicular to the first direction and parallel to the first and second center longitudinal axes. The second length is smaller the first length.

In accordance with a seventh aspect of the present invention, the hydraulic hose fitting according to the third aspect is configured so that the projecting part includes a circumferential seal extending around the first center longitudinal axis.

In accordance with an eighth aspect of the present invention, the hydraulic hose fitting according to the first aspect is configured so that the second fluid passageway extends along a third center longitudinal axis, the third center longitudinal axis extending transverse to the first center longitudinal axis.

In accordance with a ninth aspect of the present invention, the hydraulic hose fitting according to the first aspect is configured so that the second connection portion has a crimped part configured to be attached to the hydraulic hose.

In accordance with a tenth aspect of the present invention, a hydraulic device is provided that basically comprises a housing having a hose attachment portion. The hose fitting attachment portion has a fluid passageway and a hose fitting attachment structure. The fluid passageway has a center longitudinal passageway axis. The hose fitting attachment structure has a center longitudinal attachment axis that is non-perpendicular and non-coaxial with the center longitudinal passageway axis.

In accordance with an eleventh aspect of the present invention, the hydraulic device according to the tenth aspect is configured so that the hose fitting attachment structure includes a threaded hole.

In accordance with a twelfth aspect of the present invention, the hydraulic device according to the tenth aspect is configured so that the housing further includes the housing further includes at least one bicycle mounting surface and at least one piston chamber. The hose fitting attachment portion has a hose fitting mounting surface. The at least one bicycle mounting surface is closer to the at least one piston chamber than the hose fitting mounting surface.

In accordance with a thirteenth aspect of the present invention, the hydraulic device according to the twelfth aspect is configured so that the at least one bicycle mounting surface is parallel to the hose fitting mounting surface.

In accordance with a fourteenth aspect of the present invention, the hydraulic device according to the thirteenth aspect is configured so that the at least one bicycle mounting surface includes a first bicycle mounting surface and a second bicycle mounting surface. The first bicycle mounting surface is provided with a first threaded hole. The second bicycle mounting surface is provided with a second threaded hole.

In accordance with a fifteenth aspect of the present invention, the hydraulic device according to the fourteenth aspect is configured so that the first bicycle mounting surface and the second bicycle mounting surface lie in a single plane.

In accordance with a sixteenth aspect of the present invention, the hydraulic device according to the fourteenth aspect is configured so that the fluid passageway is disposed between the first bicycle mounting surface and the second bicycle mounting surface.

In accordance with a seventeenth aspect of the present invention, the hydraulic device according to the twelfth aspect further comprises a mounting bracket attached to the at least one bicycle mounting surface. The mounting bracket has an opening that extends through a first side and a second side of the mounting bracket. The hose attachment portion extends through the opening of the mounting bracket. The at least one bicycle mounting surface is disposed on the first side of the mounting bracket. The hose fitting mounting surface is disposed on the second side of the mounting bracket.

In accordance with an eighteenth aspect of the present invention, the hydraulic device according to the tenth aspect further comprises a piston movably mounted in a piston chamber of the housing, and a friction pad movably mounted to the housing by movement of the piston relative to the housing.

In accordance with a nineteenth aspect of the present invention, the hydraulic device according to the tenth aspect further comprises a lever mounted on the housing.

Also other objects, features, aspects and advantages of the disclosed hydraulic hose fitting will become apparent to those skilled in the art from the following detailed description, which, taken in conjunction with the annexed drawings, discloses one embodiment of the hydraulic hose fitting.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
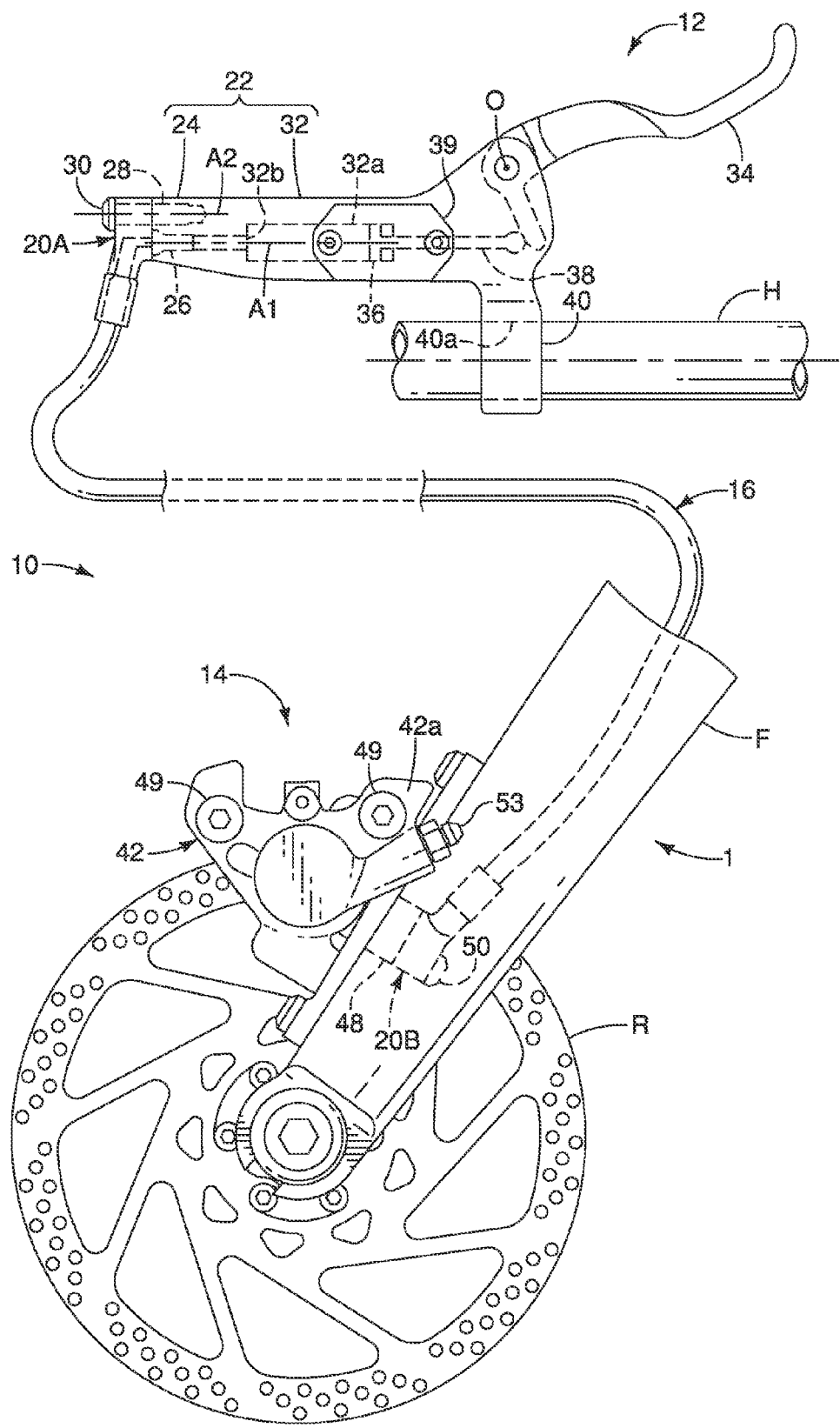
FIG. 1 is a side elevational view of a portion of a bicycle that is equipped with a bicycle hydraulic system including a hydraulic brake operating device, a hydraulic brake caliper, and a hydraulic hose with a pair of hydraulic hose fittings in accordance with a first illustrated embodiment.

Referring initially to FIG. 1, a portion of a bicycle 1 is illustrated that is equipped with a bicycle hydraulic system 10 that includes a hydraulic brake operating device 12, a hydraulic brake caliper 14 and a hydraulic hose 16. The hydraulic hose 16 is fluidly connected to the hydraulic brake operating device 12 and the hydraulic brake caliper 14 by a pair of hydraulic hose fittings 20A and 20B in accordance with the first illustrated embodiment. The hydraulic brake operating device 12 and the hydraulic brake caliper 14 are examples of hydraulic devices. The hydraulic hose fitting 20A is attached to the hydraulic brake operating device 12. The hydraulic hose fitting 20B is attached to the hydraulic brake caliper 14. The hydraulic hose 16 is a typical flexible tube that is used in hydraulic braking systems for conveying hydraulic fluid. In the illustrated embodiment, the hydraulic hose fittings 20A and 20B are crimped onto the ends of the hydraulic hose 16.

Bicycles and their various components are well-known in the prior art, and thus, the bicycle 1 and its various components will not be discussed or illustrated in detail herein, except for the components of the bicycle hydraulic system 10. In other words, only the bicycle hydraulic system 10 will be discussed and illustrated in further detail herein. Moreover, since most disc brake assemblies are well known to those skilled in the field, the bicycle hydraulic system 10 will only be discussed and illustrated to the extent needed to understand the present disclosure. Here, the first embodiment, the bicycle 1 includes a handlebar H (only partially shown) and a front fork F (only partially shown). The hydraulic brake operating device 12 is mounted to the handlebar H at a location adjacent to a grip portion of the handlebar H. The hydraulic brake caliper 14 is mounted to the front fork F at a location adjacent to a bottom end portion so that the hydraulic brake caliper 14 can selectively grip a brake rotor R. The brake rotor R is rotatably mounted to the front fork F by a hub (not shown) in a conventional manner. Of course, the hydraulic brake caliper 14 can be mounted to a portion of a bicycle frame to apply a braking force to a brake rotor that is mounted on a rear wheel.

Still referring to FIG. 1, the hydraulic brake operating device 12 (i.e., a hydraulic device) basically comprises a housing 22 having a hose attachment portion 24. The hose attachment portion 24 has a fluid passageway 26 and a hose fitting attachment structure 28. The housing 22 is constructed of a suitable rigid material such as a metallic material. The hydraulic hose 16 is fluidly connected to the hose attachment portion 24 of the hydraulic brake operating device 12 by the hydraulic hose fittings 20A and 20B. Here, the hose fitting attachment structure 28 includes a threaded hole. A bolt 30 is screwed into the hose fitting attachment structure 28 (i.e., the threaded hole) for fixing the hydraulic hose fitting 20A to the hose attachment portion 24 of the hydraulic brake operating device 12. In this way, the interior passage of the hydraulic hose 16 is fluidly connected to the fluid passageway 26 of the hydraulic brake operating device 12 via the hydraulic hose fitting 20A. The fluid passageway 26 has a center longitudinal passageway axis A1. The hose fitting attachment structure has a center longitudinal attachment axis A2 that is non-perpendicular and non-coaxial with the center longitudinal passageway axis A1. In the first embodiment, the center longitudinal attachment axis A2 is parallel to the center longitudinal passageway axis A1.

The connection between the hydraulic hose fitting 20A and the hydraulic brake operating device 12 is identical to the connection between the hydraulic hose fitting 20B and the hydraulic brake caliper 14. The connection between the hydraulic hose fitting 20B and the hydraulic brake caliper 14 is discussed and illustrated in more detail below. Thus, the description of the connection between the hydraulic hose fitting 20B and the hydraulic brake caliper 14 applies to the connection between the hose attachment portion 24 of the hydraulic brake operating device 12 and the hydraulic hose fitting 20A. Since the hydraulic hose fittings 20A and 20B are identical, only the connection between the hydraulic hose fitting 20B and the hydraulic brake caliper 14 will be discussed and illustrated in detail herein for the sake of brevity.

Other than the hose attachment portion 24 of the hydraulic brake operating device 12 and its connection to the hydraulic hose fitting 20A, the hydraulic brake operating device 12 is a conventional hydraulic brake operating device. Thus, the hydraulic brake operating device 12 will now only be briefly discussed in further detail.

The housing 22 includes a master cylinder 32 that defines a master piston chamber 32a in which the fluid passageway 26 is connected to an outlet port 32b of the piston chamber 32a. In the illustrated embodiment, as seen in FIG. 1, the hose attachment portion 24, the hose fitting attachment structure 28 and the master cylinder 32 are integrally formed as a single piece (i.e., one-piece member) that form part of the housing 22. A piston 36 is movably disposed within the master piston chamber 32a (i.e., a master cylinder bore).

The hydraulic brake operating device 12 further includes a brake lever 34 that is pivotally mounted on the housing 22 for moving the piston 36. In other words, the piston 36 moves axially within the master piston chamber 32a in response to pivotal movement of the brake lever 34 about a pivot axis O. In particular, the piston 36 moves along a center axis of the master piston chamber 32a from a first (non-actuated) position to a second (actuated) position in response to the pivotal movement of the brake lever 34 towards the handlebar H. In this way, the hydraulic fluid is pressurized to actuate the hydraulic brake caliper 14. The brake lever 34 is constructed of a suitable rigid material such as a metallic material or a hard plastic material. In the first embodiment the center axis of the master piston chamber 32a is coaxial with the center longitudinal passageway axis A1.

In the first embodiment, a connecting rod 38 operatively connects the brake lever 34 to the piston 36 for translating the pivotal movement of the brake lever 34 into linear movement of the piston 36. In this way, the piston 36 moves along the center axis of the master piston chamber 32a between the first position (i.e., the non-actuated or rest position) and the second position (i.e., the actuated position). In the illustrated embodiment, a biasing member (not shown) is disposed in the master piston chamber 32a for biasing the piston 36 to the first (non-actuated) position. The biasing member also biases the brake lever 34 to the lever resting (non-actuated) position. For example, the biasing member can be a coil compression spring.

In the first embodiment, the hydraulic brake operating device 12 is provided with a reservoir tank 39 for supplying a suitable hydraulic fluid (e.g., mineral oil) to the master piston chamber 32a. In other words, the reservoir tank 39 is filled with a suitable hydraulic fluid (e.g., mineral oil), which flows into the master piston chamber 32a via a fluid communication passageway (not shown). Alternatively, the hydraulic brake operating device 12 can be constructed without a reservoir tank if needed and/or desired.

As seen in FIG. 1, the housing 22 further includes at least one bicycle attachment structure 40 having a bicycle mounting surface 40a. Here, the bicycle attachment structure 40 is a handlebar attachment portion that is mounted to the handlebar H. In the illustrated embodiment, the bicycle attachment structure 40 is a conventional one-piece clamp band that is integrally formed with the housing 22. A fastener (not shown) is provided to the band clamp for tightening the band clamp on the handlebar H in a conventional manner. Of course, alternatively, the clamp band of the bicycle attachment structure 40 can be a two piece clamp band in which a first clamp portion is pivotally mounted to a second clamp portion with a fastener being provided to tighten the first and second clamping portions on the handlebar H in a conventional manner. Moreover, alternatively, it will be apparent from this disclosure that the bicycle attachment structure 40 can be a separate member (either a one-piece band clamp or a two-piece band clamp) that is attached to the housing 22 by a suitable fastening member.

Figure 4:
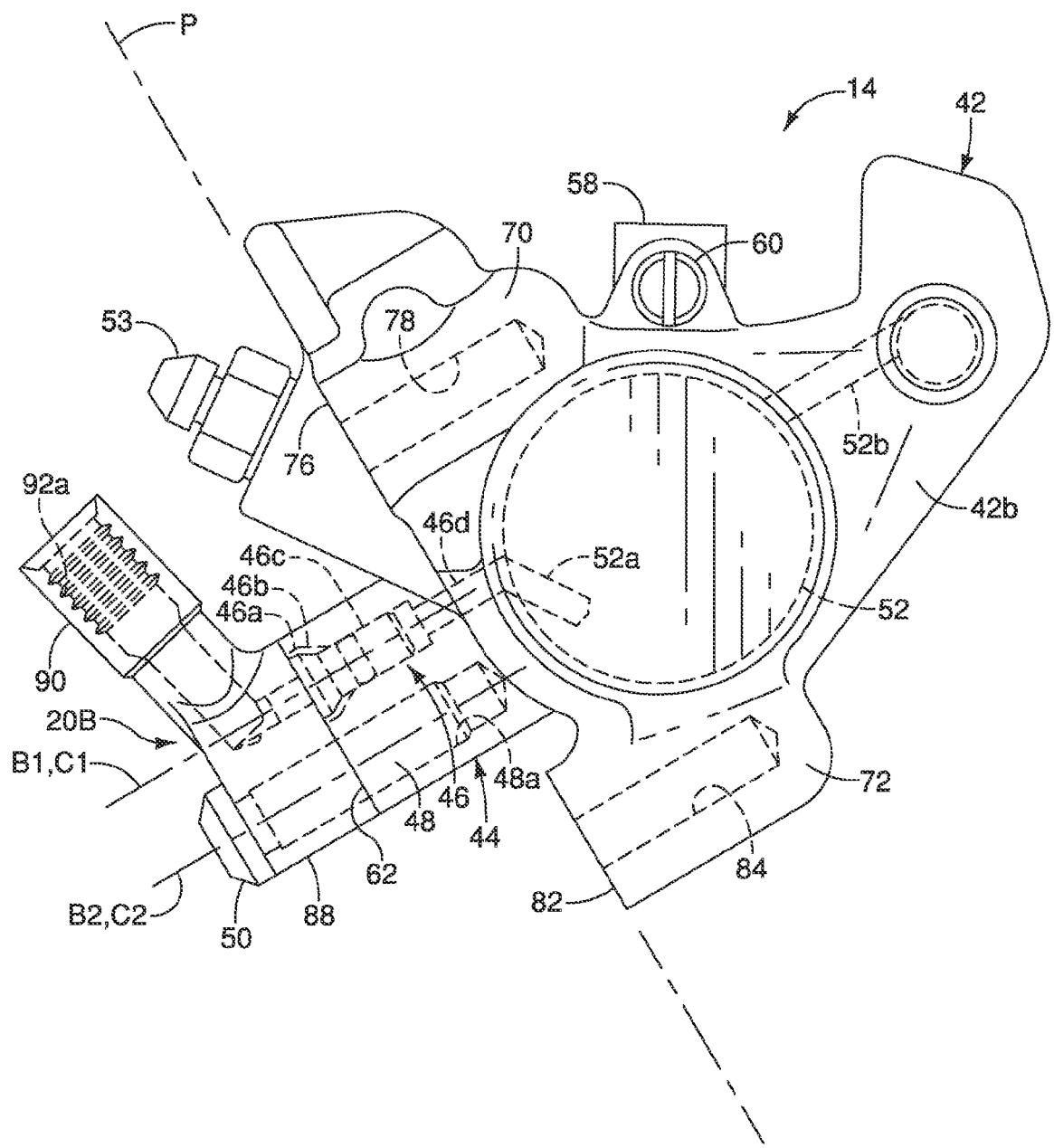
FIG. 4 is a side elevational view, similar to FIG. 3, of the hydraulic brake caliper and the hydraulic hose fitting illustrated in FIGS. 1 to 3, but with the mounting bracket removed.
Figure 5:
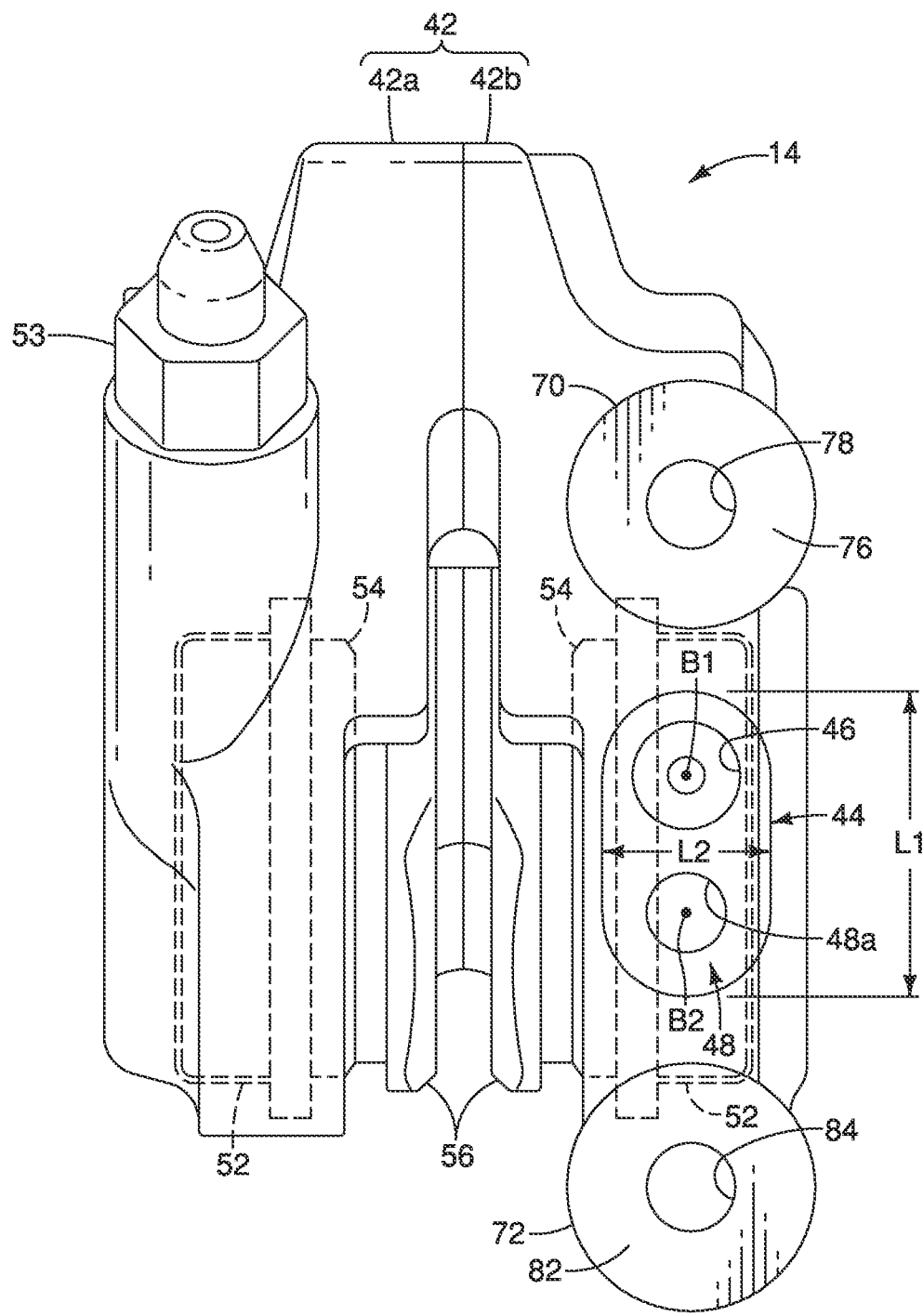
FIG. 5 is a peripheral view of the hydraulic brake caliper illustrated in FIGS. 1 to 4, but with the hydraulic hose fitting and the mounting bracket removed.
Figure 6:
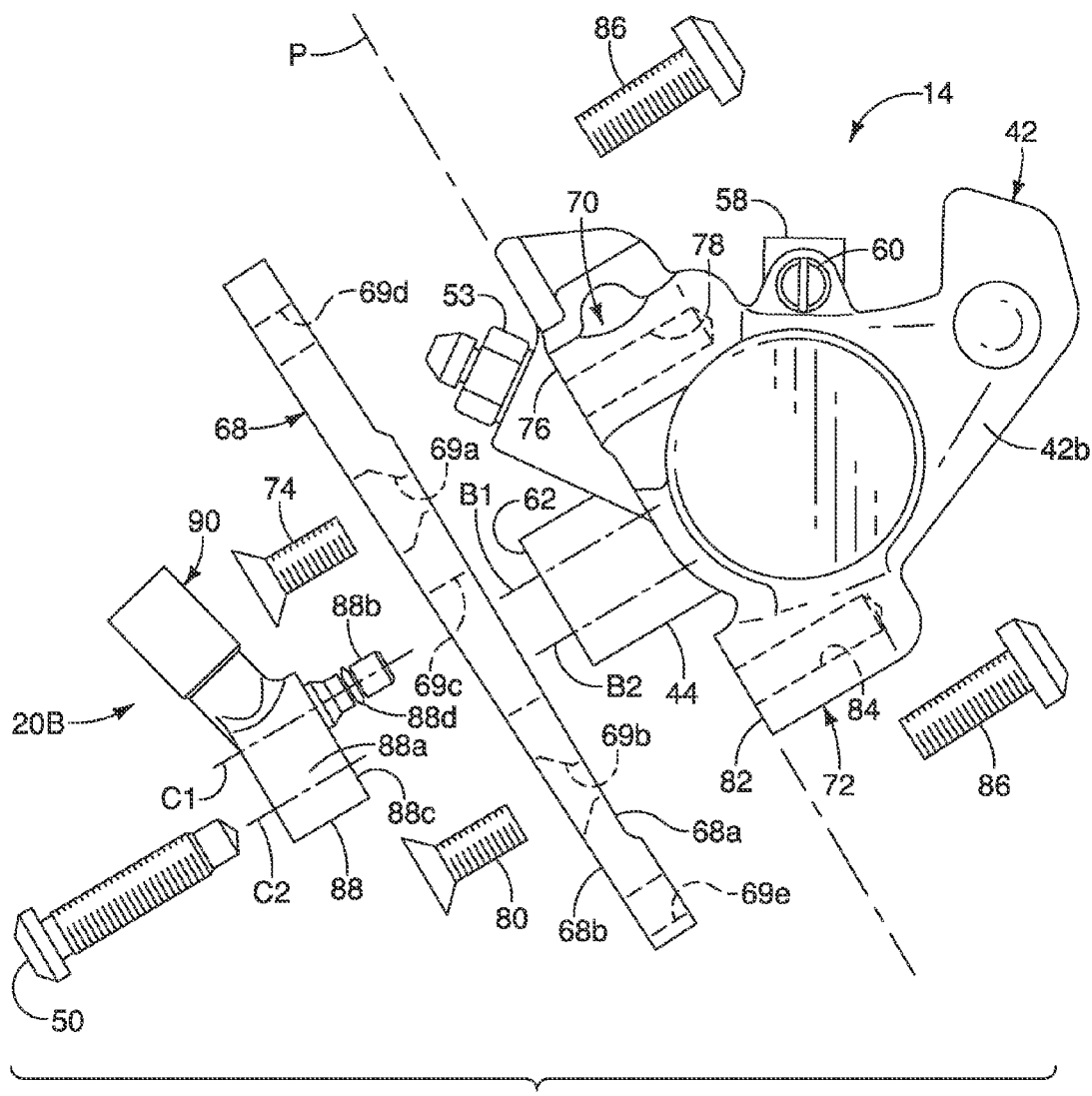
FIG. 6 is an exploded side elevational view of the hydraulic brake caliper, the hydraulic hose fitting and the mounting bracket.

Now, the hydraulic brake caliper 14 will be discussed in more detail with reference mainly to FIGS. 2 to 8. Here, the hydraulic brake caliper 14 is a disc brake caliper is mounted to a portion of a bicycle to selectively engage the brake rotor R in response to operation of the hydraulic brake operating device 12. The hydraulic brake caliper 14 (i.e., a hydraulic device) basically comprises a housing 42 (i.e., caliper housing) having a hose fitting attachment portion 44. The hose fitting attachment portion 44 has a fluid passageway 46 and a hose fitting attachment structure 48. The housing 42 includes a first housing part 42a and a second housing part 42b (FIG. 5). The first and second housing parts 42a and 42b are fixed together by a pair of fixing bolts 49 (FIG. 8). The first and second housing parts 42a and 42b are constructed of a suitable rigid material such as a metallic material.

The hydraulic hose 16 is fluidly connected to the hose fitting attachment portion 44 of the hydraulic brake caliper 14 by the hydraulic hose fitting 20B. Here, the hose fitting attachment structure 48 includes a threaded hole 48a (FIGS. 4 and 5). A bolt 50 is screwed into the threaded hole 48a for fixing the hydraulic hose fitting 20B to the hose fitting attachment portion 44 of the hydraulic brake caliper 14. In this way, the interior passage of the hydraulic hose 16 is fluidly connected to the fluid passageway 46 of the hydraulic brake caliper 14 via the hydraulic hose fitting 20B. The fluid passageway 46 has a center longitudinal passageway axis B1. The threaded hole 48*a* of the hose fitting attachment structure 48 has a center longitudinal attachment axis B2 that is non-perpendicular and non coaxial with the center longitudinal passageway axis B1. In the first embodiment, the center longitudinal attachment axis B2 is parallel to the center longitudinal passageway axis B1.

As seen in FIGS. 4 and 5, the housing 42 defines a pair of piston chambers 52 in which one of the piston chambers 52 has a port 52*a* that is fluidly connected to the fluid passageway 46. The housing 42 further includes a communication passageway 52*b* that fluidly interconnects the piston chambers 52. In the illustrated embodiment, the communication passageway 52*b* is generally an inverted U-shaped channel with a portion of the communication passageway 52*b* extending along one of the fixing bolts 49. In this way, the hydraulic fluid can first flow into the piston chamber 52 of the second housing part 42*b* and then flow through the communication passageway 52*b* to the piston chamber 52 of the first housing part 42*a*. Thus, the pivotal movement of the brake lever 34 of the hydraulic brake operating device 12 towards the handlebar causes the hydraulic fluid to flow from the master piston chamber 32*a* towards the hydraulic brake caliper 14 via the hydraulic hose 16. When the hydraulic fluid enters the housing 42 via the fluid passageway 46, the hydraulic fluid first flows into one of the piston chambers 52 and then flows into the other of the piston chambers 52 via the communication passageway 52*b*. In this way, the hydraulic fluid is pressurized to actuate the hydraulic brake caliper 14. The housing 42 is provided with a bleed valve 53 that fluidly communicates with one of the piston chambers 52.

Referring to FIG. 5, the hydraulic brake caliper 14 further includes a pair of pistons 54 and a pair of friction pads 56. As seen in FIG. 4, a biasing member 58 is provided between the friction pads 56 to bias the pistons 54 and the friction pads 56 apart from each other. A brake pad pin 60 is mounted to the housing 42 to movably support the friction pads 54 and the biasing member 58. As seen in FIG. 5, the pistons 54 are movably mounted in the piston chambers 52 of the housing 42. Thus, the friction pads 56 are movably mounted to the housing 42 by movement of the pistons 54 relative to the housing 42. In particular, the hydraulic fluid is pressurized by actuation of the hydraulic brake operating device 12 such that the pistons 54 move towards each other to push the friction pads 56 against the brake rotor R.

The hose fitting attachment portion 44 further has a hose fitting mounting surface 62. The fluid passageway 46 and the hose fitting attachment structure 48 (i.e., the threaded hole) opens to the hose fitting mounting surface 62. The fluid passageway 46 includes a first cylindrical section 46*a*, an annular tapered section 46*b*, a second cylindrical section 46*c* and a third cylindrical section 46*d*. The first cylindrical section 46*a* opens at the hose fitting mounting surface 62 and extends from the hose fitting mounting surface 62 towards the piston chambers 52. The first cylindrical section 46*a* has a larger diameter than a diameter of the second cylindrical section 46*c*. The annular tapered section 46*b* has a truncated cone shape that interconnects the first and second cylindrical sections 46*a* and 46*c*. The second cylindrical section 46*c* has a larger diameter than a diameter of the third cylindrical section 46*d*.

Referring to FIGS. 2, 6 to 8, the hydraulic device 14 further comprises a mounting bracket 68 that is used for attaching the housing 42 to the fork F. The housing 42 includes at least one bicycle mounting surface. Here, in the first embodiment, the housing 42 includes a first bicycle attachment structure 70 and a second bicycle attachment structure 72. The mounting bracket 68 is attached to the first and second bicycle attachment structures 70 and 72. More specifically, the first bicycle attachment structure 70 has a first bolt 74, and a first bicycle mounting surface 76 being provided with a first threaded hole 78. Similar to the first bicycle attachment structure 70, the second bicycle attachment structure 72 has a second bolt 80, and a second bicycle mounting surface 82 being provided with a second threaded hole 84. In the first embodiment, the first and second bicycle mounting surfaces 76 and 82 are closer to the piston chambers 52 than the hose fitting mounting surface 62 of the hose fitting attachment portion 44. In this way, the hose fitting attachment portion 44 can located inside the front fork F as explained below. Also, the fluid passageway 46 is disposed between the first bicycle mounting surface 76 and the second bicycle mounting surface 82. In the first embodiment, the first and second bicycle mounting surfaces 76 and 82 are parallel to each other. The first bicycle mounting surface 76 and the second bicycle mounting surface 82 lie in a single plane P (FIG. 4). Further, the first and second bicycle mounting surfaces 76 and 82 are parallel to the hose fitting mounting surface 62.

The mounting bracket 68 is attached to the first and second mounting surfaces 76 and 82 of the housing 42. The mounting bracket 68 has first and second mounting holes 69*a* and 69*b* that extend through a first side 68*a* and a second side 68*b* of the mounting bracket 68. The mounting bracket 68 further has an opening 69*c* that extends through the first side 68*a* and the second side 68*b* of the mounting bracket 68. The first and second sides 68*a* and 68*b* face in opposite directions. The opening 69*c* is arranged between the first and second mounting holes 69*a* and 69*b* on the mounting bracket 68. The first bolt 74 extend through the first mounting hole 69*a*, and then screwed into the first threaded hole 78 to fix the mounting bracket 68 to the housing 42. The second bolt 80 extend through the second mounting hole 69*b*, and then screwed into the second threaded hole 84 to fix the mounting bracket 68 to the housing 42. The opening 69*c* of the mounting bracket 68 accommodates the hose fitting attachment portion 44. In particular, when the mounting bracket 68 is fixed to the housing 42 by the first and second bolts 74 and 80, the hose fitting attachment portion 44 extends through the opening 69*c* of the mounting bracket 68. In this state, the first and second bicycle mounting surfaces 76 and 82 are disposed on the first side 68*a* of the mounting bracket 68, and the hose fitting mounting surface 62 is disposed on the second side 68*b* of the mounting bracket 68.

Figure 2:
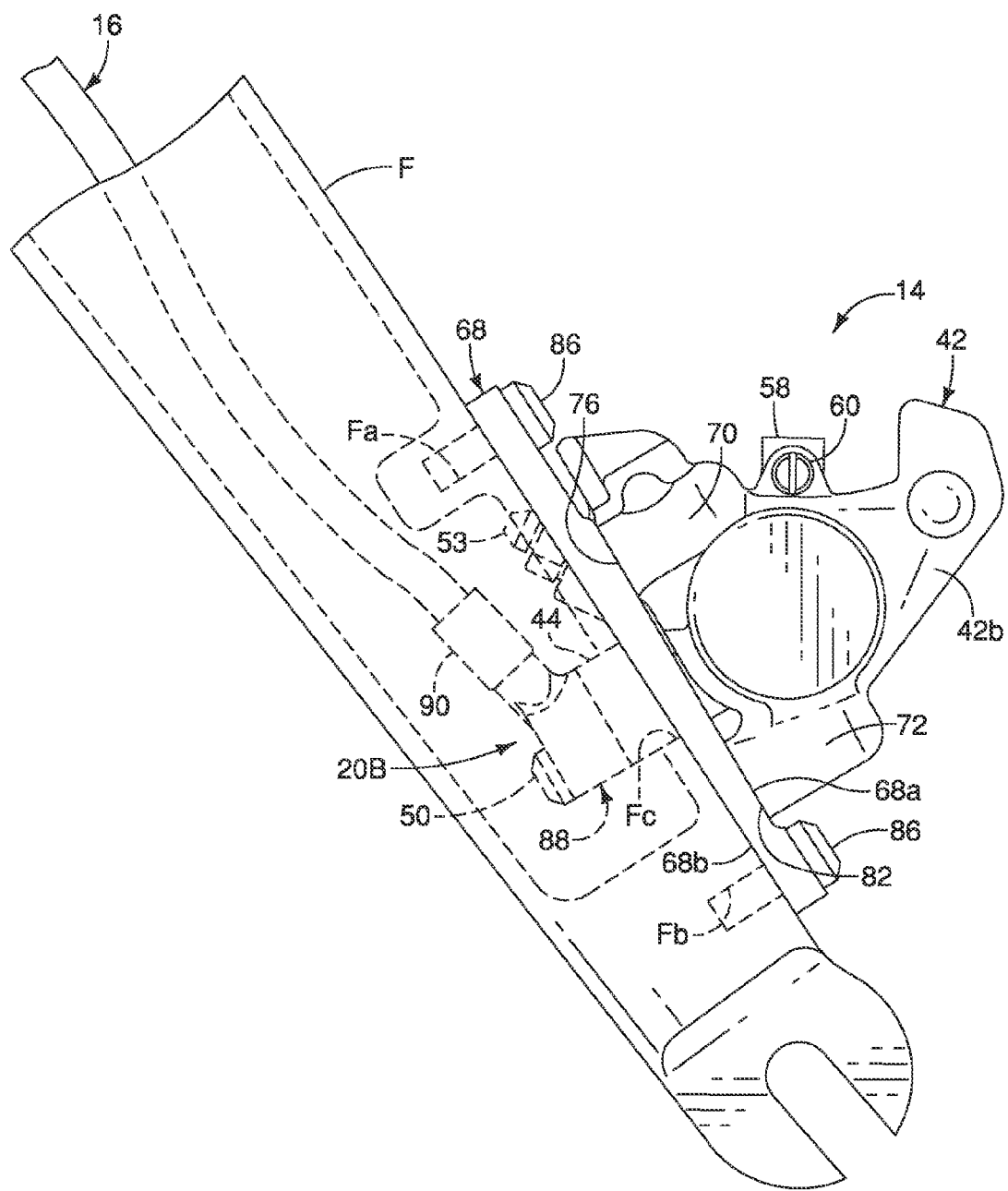
FIG. 2 is an enlarged side elevational view of a portion of the front fork with the hydraulic brake caliper attached to the front fork via the mounting bracket and the hydraulic hose fitting and a portion of the hydraulic hose located inside the front fork.
Figure 3:
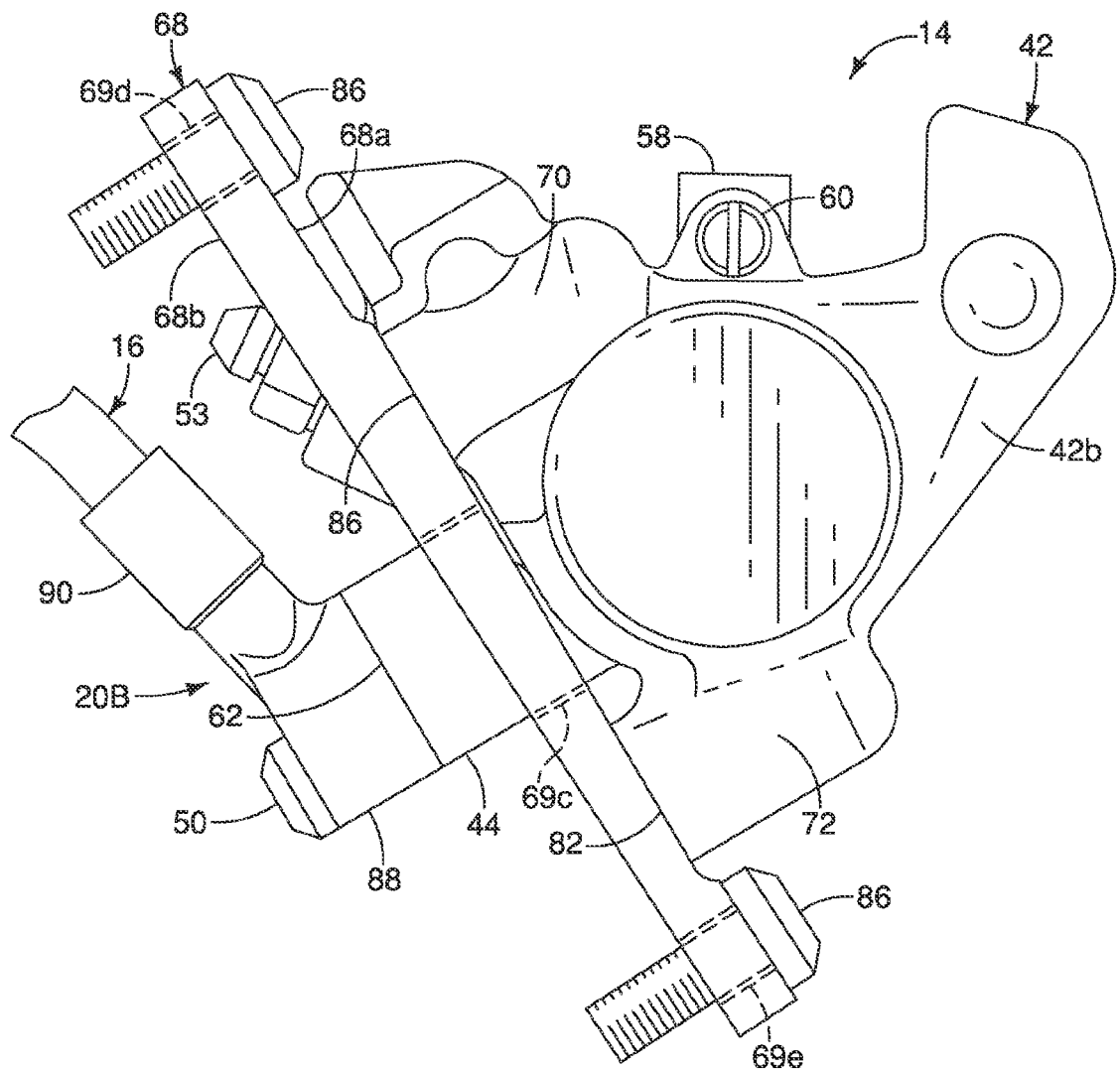
FIG. 3 is a side elevational view of the hydraulic brake caliper with the hydraulic hose fitting and the mounting bracket attached to the hydraulic brake caliper and the hydraulic hose attached to the hydraulic hose fitting.

The mounting bracket 68 further has third and fourth mounting holes 69*d* and 69*e*. As seen in FIG. 2, the front fork F has threaded mounting holes Fa and Fb for receiving a pair of bolts 86 to attach the mounting bracket 68 to the front fork F. More specifically, the bolts 86 extend through the third and fourth mounting holes 69*d* and 69*e* of the mounting bracket 68, and then screwed into the threaded mounting holes Fa and Fb of the front fork F, respectively, to fix the mounting bracket 68 and the housing 42 to the front fork F. When the mounting bracket 68 is fixed to the housing 42 by the first and second bolts 74 and 80 and to the front fork F by the bolts 86, the hose fitting attachment portion 44 extends through an opening Fc of the front fork F. In this way, the hydraulic hose fitting 20B is disposed completely inside the front fork F. As a result, the hydraulic hose 16 and the hydraulic hose fitting 20B are protected inside the front fork F.

While the housing 42 includes the first and second bicycle attachment structures 70 and 72 in the first embodiment, it will be apparent from this disclosure that the housing 42 can have only one or more than two bicycle attachment structure as needed and/or desired. Thus, the housing 42 includes at least one bicycle mounting surface. The at least one bicycle mounting surface is provided with a threaded hole. Also preferably, the at least one bicycle mounting surface is parallel to the hose fitting mounting surface 62, and the at least one bicycle mounting surface is closer to the piston chambers 52 than the hose fitting mounting surface 62.

Now, the hydraulic hose fitting 20B will be discussed in more detail with reference mainly to FIGS. 4, 8, 9 and 10. The hydraulic hose fitting 20B basically comprises a first connection portion 88 and a second connection portion 90. The first connection portion 88 is configured to be attached to a hydraulic device such as the hydraulic brake caliper 14 in the first embodiment. The second connection portion 90 is configured to be attached to the hydraulic hose 16. In the first embodiment, the first and second connection portions 88 and 90 are integrally formed as a single piece (i.e., a one-piece member) of a suitable material such as a metallic material.

Figure 8:
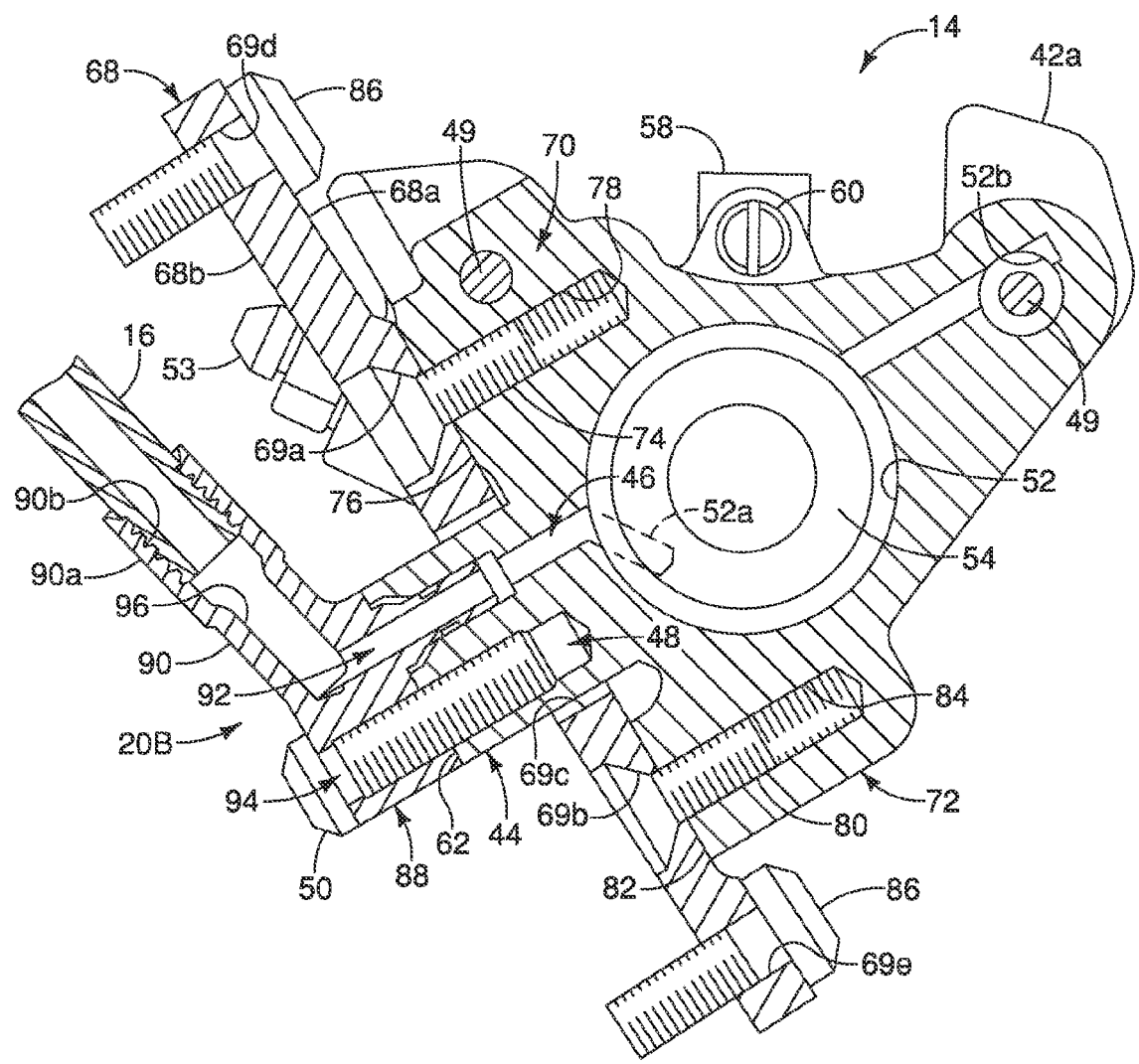
FIG. 8 is a cross sectional view of the housing of the hydraulic brake caliper, the hydraulic hose fitting and the mounting bracket as seen along section line 8-8 of FIG. 7.
Figure 9:
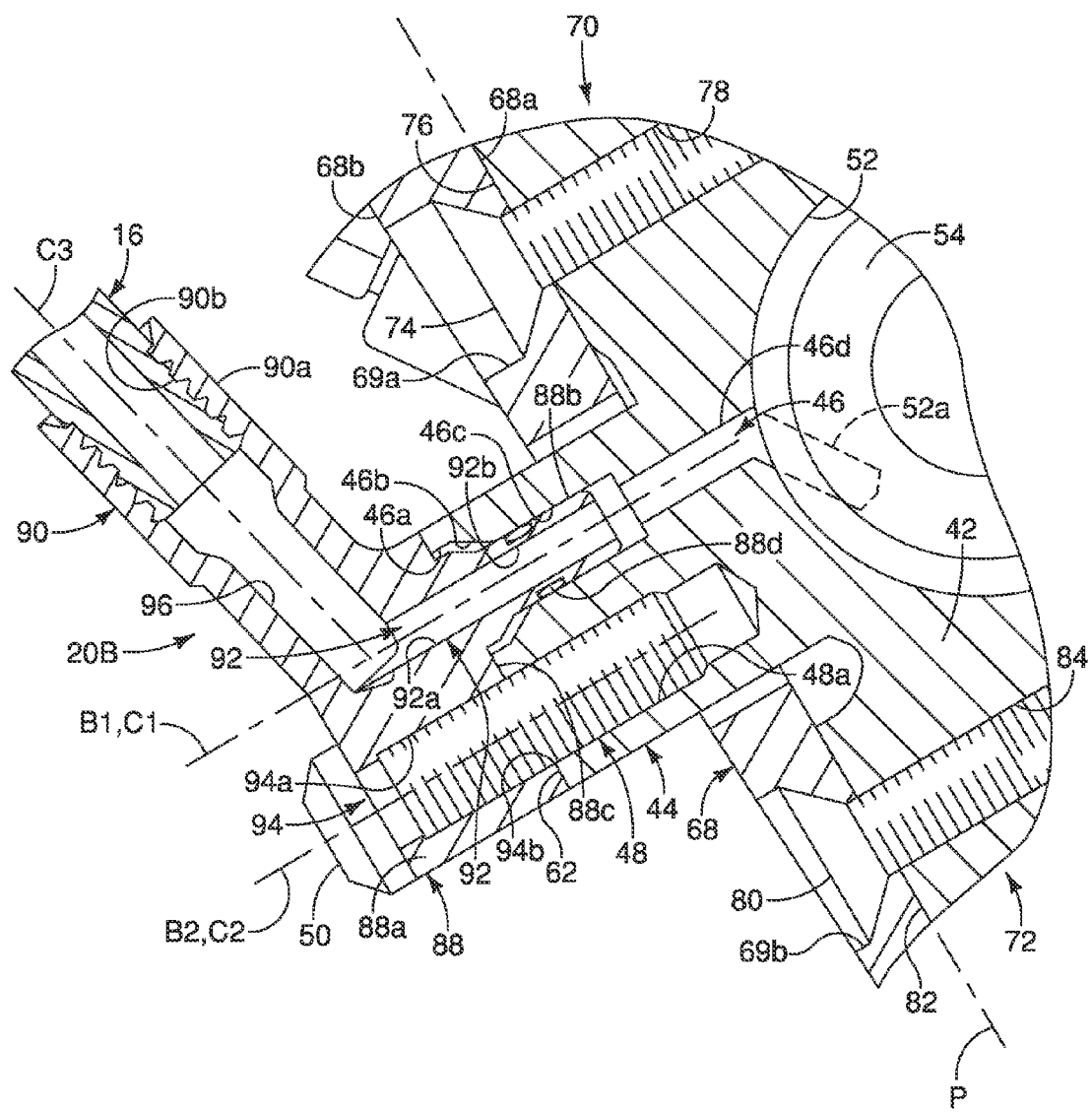
FIG. 9 is an enlarged cross sectional view of a portion of the hydraulic brake caliper with the hydraulic hose fitting and the mounting bracket attached to the housing of the hydraulic brake caliper.
Figure 10:
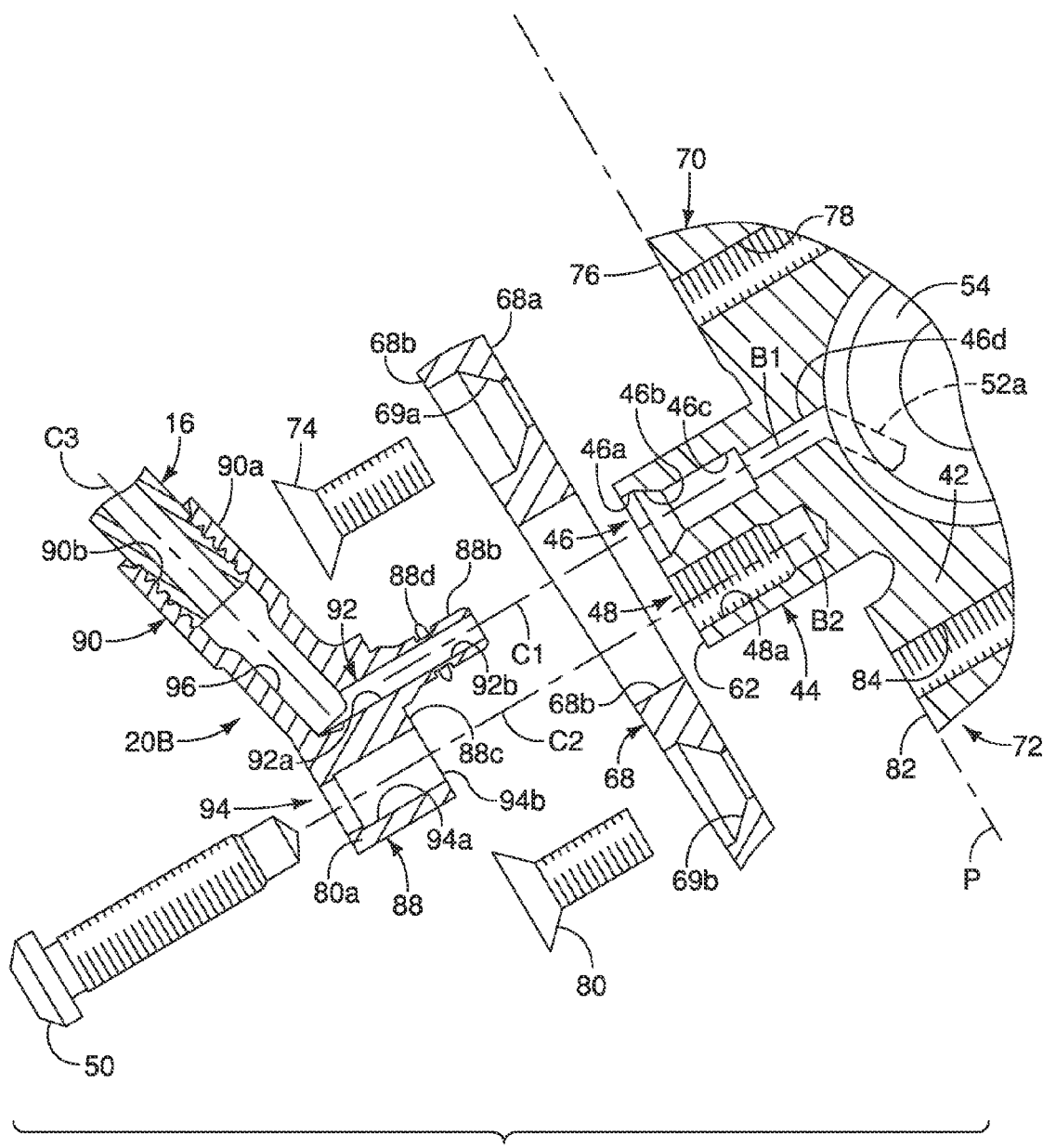
FIG. 10 is an exploded cross sectional view of the portion of the hydraulic brake caliper, the hydraulic hose fitting and the mounting bracket that is illustrated in FIG. 9.

Referring to FIGS. 8, 9 and 10, the first connection portion 88 has a first fluid passageway 92 with a first center longitudinal axis C1 and a fastener structure 94. The fastener structure 94 preferably includes one of a fastener receiving hole and an attachment stud. In the first embodiment, the fastener structure 94 includes a fastener receiving hole 94a. The fastener receiving hole 94a of the fastener structure 94 has a second center longitudinal axis C2 that is non-perpendicular and non-coaxial with the first center longitudinal axis C1. In the first embodiment, the second center longitudinal axis C2 is parallel to the first center longitudinal axis C1. Further, as seen in FIG. 10, when the hydraulic hose fitting 20B is attached to the hydraulic brake caliper 14, the first center longitudinal axis C1 is coaxial with the center longitudinal passageway axis B1 of the fluid passageway 46, and the second longitudinal axis C2 is coaxial with the center longitudinal attachment axis B2. The first connection portion 88 includes a base part 88a and a projecting part 88b.

Figure 7:
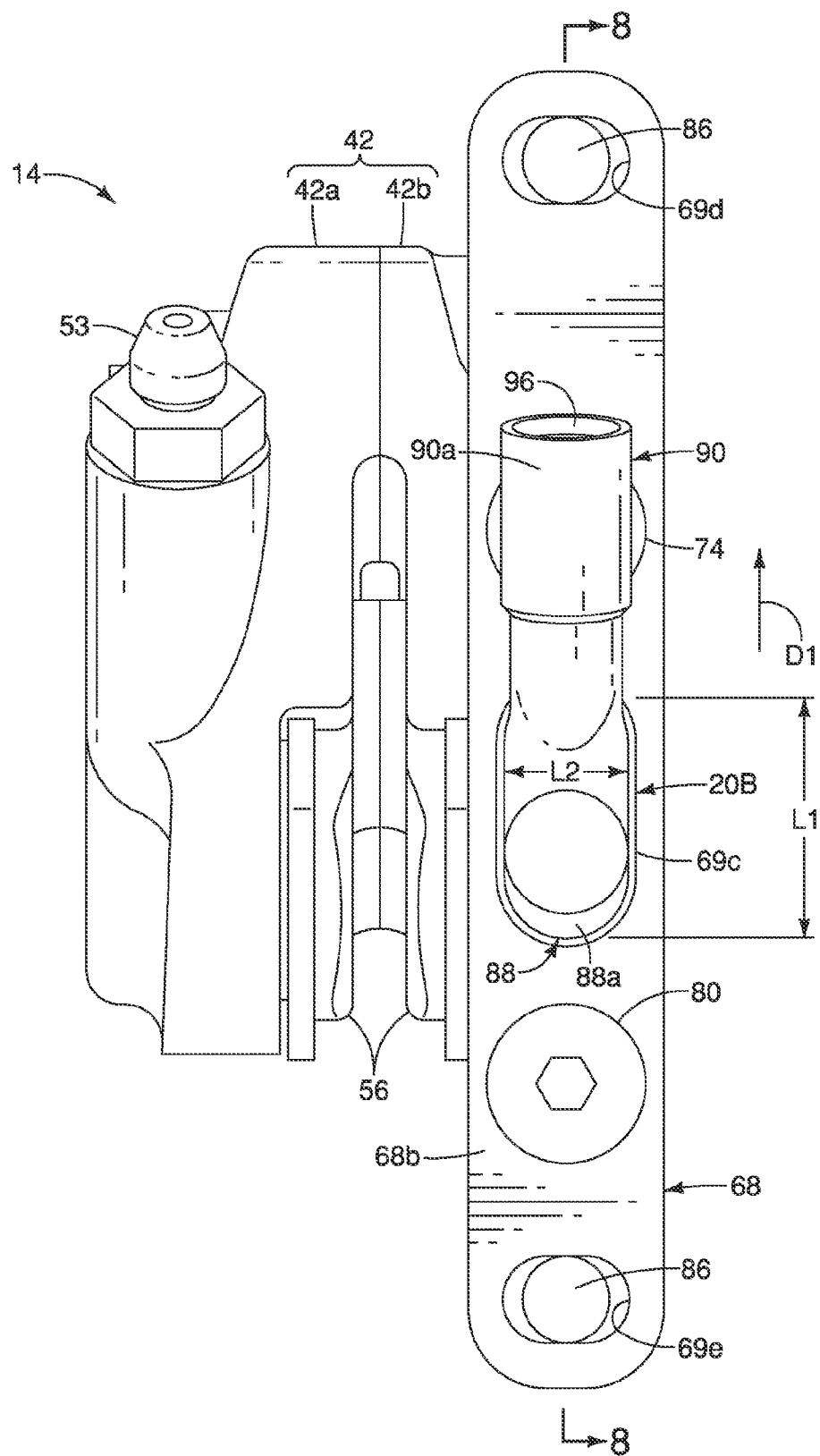
FIG. 7 is a peripheral view, similar to FIG. 5, of the hydraulic brake caliper but with the hydraulic hose fitting and the mounting bracket attached thereto.

As seen in FIGS. 5 and 7, the base part 88a has a length L1 measured in a first direction D1 which perpendicularly intersects the first and second center longitudinal axes C1 and C2. The base part 88a further has a second length L2 measured in a second direction which is perpendicular to the first direction D1 and parallel to the first and second center longitudinal axes C1 and C2. The second length L2 is smaller the first length L1.

Referring to FIGS. 9 and 10, the base part 88a also includes a first section 92a of the first fluid passageway 92. The projecting part 88b includes a second section 92b of the first fluid passageway 92. The base part 88a has a hydraulic device mounting surface 88c. The projecting part 88b projects from the hydraulic device mounting surface 88c. The projecting part 88b includes a circumferential seal 88d extending around the center longitudinal axis C1 of the first fluid passageway 92. In the first embodiment, the fastener receiving hole 94a has an opening 94b in the hydraulic device mounting surface 88c.

The second connection portion 90 has a second fluid passageway 96 fluidly communicating with the first fluid passageway 92. The second fluid passageway 96 extends along a third center longitudinal axis C3. The third center longitudinal axis C3 extends transverse to the first center longitudinal axis C1. The second connection portion 90 has a crimped part 90a configured to be attached to the hydraulic hose 16. In other words, the second connection portion 90 has a crimped connection configured to attach the hydraulic hose 16. Here, the crimped part 90a of the second connection portion 90 is provided with a plurality of annular ribs 90b along its interior surface that defines the second fluid passageway 96. Thus, the annular ribs 90b form a crimped connection that is deformed (i.e., crimped) onto an end of the hydraulic hose 16.

Figure 11:
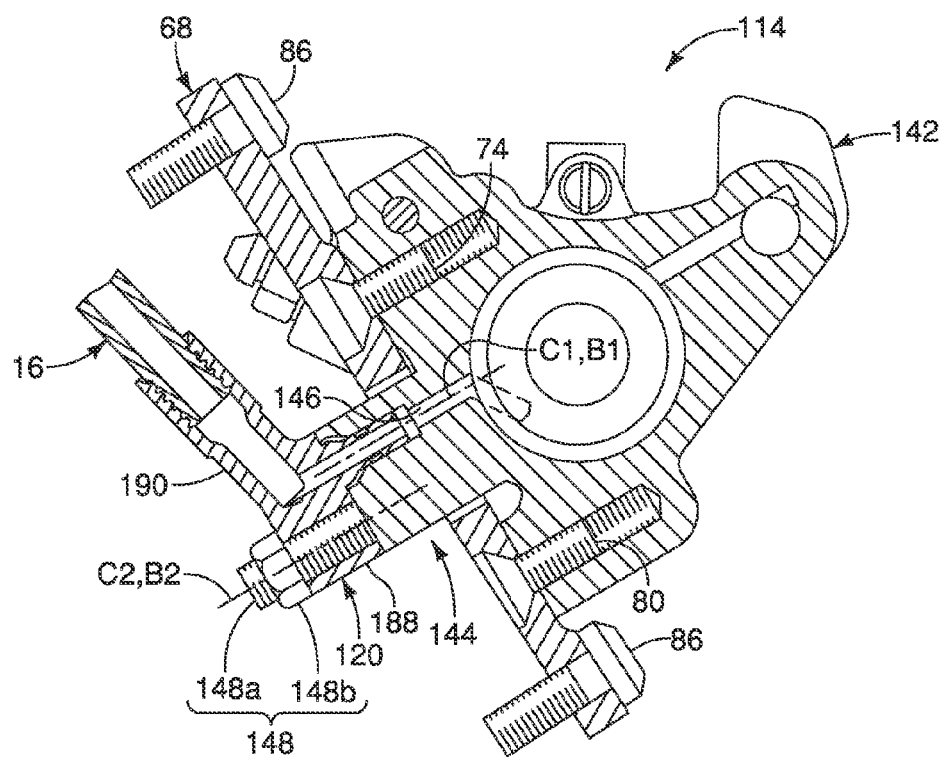
FIG. 11 is a cross sectional view, similar to FIG. 8, of a hydraulic brake caliper, a hydraulic hose fitting and a mounting bracket in accordance with a second illustrated embodiment.

Referring now to FIG. 11, a hydraulic brake caliper 114 and a hydraulic hose fitting 120 are illustrated in accordance with a second illustrated embodiment. The hydraulic brake caliper 114 and the hydraulic hose fitting 120 are identical to the hydraulic brake caliper 14 and the hydraulic hose fitting 20B, except that the attachment connection between the hydraulic brake caliper 114 and the hydraulic hose fitting 120 has be modified.

Specifically, the hydraulic brake caliper 114 (i.e., a hydraulic device) basically comprises a housing 142 (i.e., caliper housing) having a hose fitting attachment portion 144 with a fluid passageway 146 and a hose fitting attachment structure 148. The housing 142 is identical to the housing 42, except that the hose fitting attachment structure 148 includes a threaded stud 148a and a nut 148b, instead of a threaded hole as in the first embodiment. The threaded stud 148a extends along the center longitudinal attachment axis B2 that is non-perpendicular and non-coaxial with the center longitudinal passageway axis B1. Since the remaining structures of the hydraulic brake caliper 114 are identical to the first embodiment, the remaining structures of the hydraulic brake caliper 214 will not be discussed and illustrated herein for the sake of brevity.

The hydraulic hose fitting 120 is identical to the hydraulic hose fitting 20B. Specifically, the hydraulic hose fitting 120 basically comprises a first connection portion 188 configured to be attached to the hydraulic brake caliper 114, and a second connection portion 190 configured to be attached to the hydraulic hose 16. The first connection portion 188 and the second connection portion 190 are identical to the first connection portion 88 and the second connection portion 90, respectively.

Figure 12:
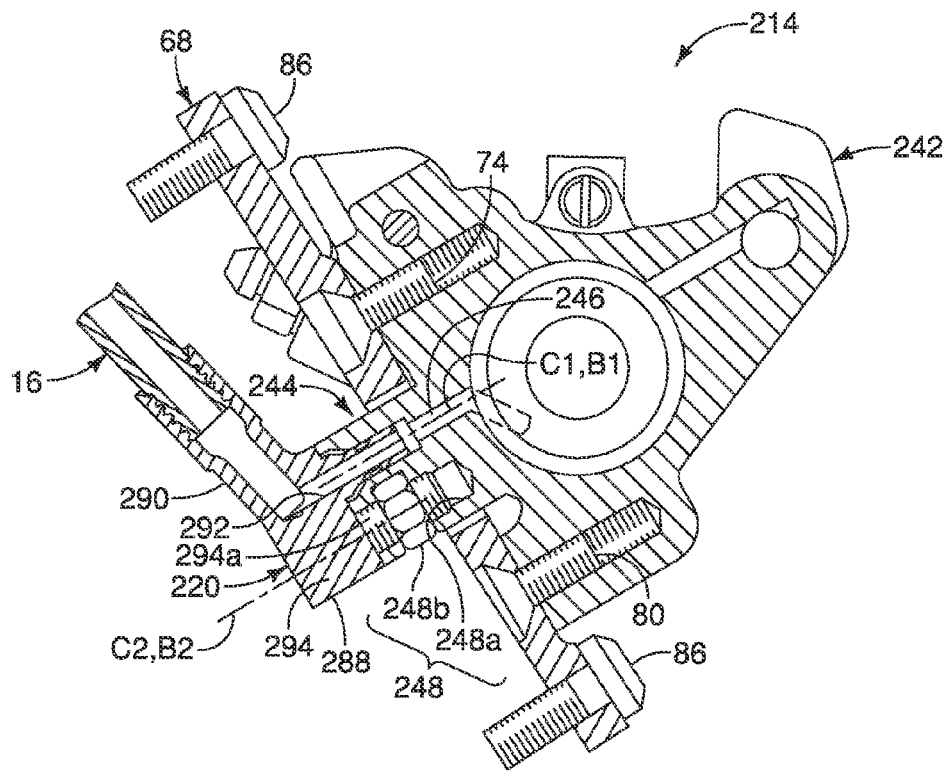
FIG. 12 is a cross sectional view, similar to FIGS. 8 and 11, of a hydraulic brake caliper, a hydraulic hose fitting and a mounting bracket in accordance with a third illustrated embodiment.

Referring now to FIG. 12, a hydraulic brake caliper 214 and a hydraulic hose fitting 220 are illustrated in accordance with a third illustrated embodiment. The hydraulic brake caliper 214 and the hydraulic hose fitting 220 are identical to the hydraulic brake caliper 14 and a hydraulic hose fitting 20B, except that the attachment connection between the hydraulic brake caliper 214 and the hydraulic hose fitting 220 has be modified.

Specifically, the hydraulic brake caliper 214 (i.e., a hydraulic device) basically comprises a housing 242 (i.e., caliper housing) having a hose fitting attachment portion 244 with a fluid passageway 246 and a hose fitting attachment structure 248. The housing 242 is identical to the housing 42, except that the hose fitting attachment structure 248 includes a non-threaded hole 248a and a nut 248b, instead of a threaded hole as in the first embodiment. The hose fitting attachment portion 244 has a recess that is configured to dispose the nut 248b at a middle of the non-threaded hole 248a.

The hydraulic hose fitting 220 basically comprises a first connection portion 288 and a second connection portion 290. The second connection portion 290 of the hydraulic hose fitting 220 is identical to the second connection portion 90 of the hydraulic hose fitting 20B. On the other hand, the first connection portion 288 differs from the first connection portion 88. Specifically, the first connection portion 288 has a first fluid passageway 292 that is identical to the first fluid passageway 92 and a fastener structure 294 that includes an attachment stud 294a instead of a fastener receiving hole 94a. The threaded stud 294a extends along the second center longitudinal axis C2 that is non-perpendicular and non-coaxial with the first center longitudinal axis C1. The non-threaded hole 248a extends along the center longitudinal attachment axis B2 that is non-perpendicular and non-coaxial with the center longitudinal passageway axis B1. Here, in this third embodiment, the attachment stud 294a is inserted into the non-threaded hole 248a, and the nut 248b is turned to secure the hydraulic hose fitting 220 to the hose fitting attachment portion 244. Since the remaining structures of the hydraulic brake caliper 214 and the hydraulic hose fitting 220 are identical to the first embodiment, the remaining structures of the hydraulic brake caliper 214 and the hydraulic hose fitting 220 will not be discussed and illustrated herein for the sake of brevity.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle hydraulic system 10. Accordingly, these directional terms, as utilized to describe the hydraulic brake operating device 12, the hydraulic brake caliper 14 and the hydraulic hose fittings 20A and 20B should be interpreted relative to a bicycle in an upright riding position on a horizontal surface and that is equipped with the bicycle hydraulic system 10. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hydraulic hose fitting comprising:
a first connection portion configured to be attached to a hydraulic device, the first connection portion having a first fluid passageway with a first center longitudinal axis and a fastener structure having a second center longitudinal axis that is non-perpendicular and non-coaxial with the first center longitudinal axis, the first connection portion further including a base part and a projecting part, the base part including the fastener structure and a first section of the first fluid passageway, the projecting part including a second section of the first fluid passageway; and
a second connection portion configured to be attached to a hydraulic hose, the second connection portion having a second fluid passageway fluidly communicating with the first fluid passageway.

2. The hydraulic hose fitting according to claim 1, wherein the second center longitudinal axis is parallel to the first center longitudinal axis.

3. The hydraulic hose fitting according to claim 1, wherein the fastener structure includes a fastener receiving hole.

4. The hydraulic hose fitting according to claim 3, wherein the base part has an attachment surface configured to be attached to the hydraulic device, the fastener receiving hole has an opening in the attachment surface, and the projecting part projects from the attachment surface.

5. The hydraulic hose fitting according to claim 1, wherein the second center longitudinal axis is parallel to the first center longitudinal axis,
the base part has a first length measured in a first direction which perpendicularly intersects the first and second center longitudinal axes, the base part has a second length measured in a second direction which is perpendicular to the first direction and perpendicular to the first and second center longitudinal axes, the second length being smaller the first length.

6. The hydraulic hose fitting according to claim 1, wherein the projecting part includes a circumferential seal extending around the first center longitudinal axis.

7. The hydraulic hose fitting according to claim 1, wherein the second fluid passageway extends along a third center longitudinal axis, the third center longitudinal axis extending transverse to the first center longitudinal axis.

8. The hydraulic hose fitting according to claim 1, wherein the second connection portion has a crimped part configured to be attached to the hydraulic hose.

9. A hydraulic device comprising:
a housing having at least one bicycle mounting surface, at least one piston chamber and a hose fitting attachment portion, the hose fitting attachment portion having a fluid passageway and a hose fitting attachment structure, the fluid passageway having a center longitudinal passageway axis, the hose fitting attachment structure has a center longitudinal attachment axis that is non-perpendicular and non-coaxial with the center longitudinal passageway axis, the hose fitting attachment portion further having a hose fitting mounting surface, the at least one bicycle mounting surface being closer to the at least one piston chamber than the hose fitting mounting surface;
a mounting bracket attached to the at least one bicycle mounting surface and having an opening that extends through a first side and a second side of the mounting bracket, the hose fitting attachment portion extending through the opening of the mounting bracket, the at least one bicycle mounting surface is disposed on the first side of the mounting bracket, and the hose fitting mounting surface is disposed on the second side of the mounting bracket.

10. The hydraulic device according to claim 9, wherein the hose fitting attachment structure includes a threaded hole.

11. The hydraulic device according to claim 9, wherein the at least one bicycle mounting surface is parallel to the hose fitting mounting surface.

12. The hydraulic device according to claim 11, wherein the at least one bicycle mounting surface includes a first bicycle mounting surface and a second bicycle mounting surface, the first bicycle mounting surface being provided with a first threaded hole, the second bicycle mounting surface being provided with a second threaded hole.

13. The hydraulic device according to claim 12, wherein the first bicycle mounting surface and the second bicycle mounting surface lie in a single plane.

14. The hydraulic device according to claim 12, wherein the fluid passageway is disposed between the first bicycle mounting surface and the second bicycle mounting surface.

15. The hydraulic device according to claim 9, further comprising
a mounting bracket attached to the at least one bicycle mounting surface and having an opening that extends through a first side and a second side of the mounting bracket, wherein
the hose fitting attachment portion extends through the opening of the mounting bracket, the at least one bicycle mounting surface is disposed on the first side of the mounting bracket, and the hose fitting mounting surface is disposed on the second side of the mounting bracket.

16. The hydraulic device according to claim 9, further comprising
a piston movably mounted in a piston chamber of the housing, and
a friction pad movably mounted to the housing by movement of the piston relative to the housing.

17. The hydraulic device according to claim 10, further comprising
a lever mounted on the housing.

* * * * *